US011135465B1

United States Patent
Melendez (10) Patent No.: US 11,135,465 B1
(45) Date of Patent: Oct. 5, 2021

(54) EXERCISE VEHICLE SEAT COVER

(71) Applicant: Vaneta Melendez, Braintree, MA (US)

(72) Inventor: Vaneta Melendez, Braintree, MA (US)

( * ) Notice: Subject to any disclaimer, the term of this patent is extended or adjusted under 35 U.S.C. 154(b) by 134 days.

(21) Appl. No.: 16/595,605

(22) Filed: Oct. 8, 2019

(51) Int. Cl.
| | |
|---|---|
| *A63B 21/04* | (2006.01) |
| *A63B 21/055* | (2006.01) |
| *A63B 23/035* | (2006.01) |
| *A63B 21/00* | (2006.01) |
| *A63B 21/16* | (2006.01) |

(52) U.S. Cl.
CPC ...... *A63B 21/0442* (2013.01); *A63B 21/0552* (2013.01); *A63B 21/1609* (2015.10); *A63B 21/4007* (2015.10); *A63B 23/03541* (2013.01)

(58) Field of Classification Search
CPC .............. A47C 9/002; A63B 21/00058; A63B 21/00061; A63B 21/00065; A63B 21/00076; A63B 21/00178; A63B 21/002; A63B 21/0023; A63B 21/02; A63B 21/04; A63B 21/0407; A63B 21/0414; A63B 21/0421; A63B 21/0428; A63B 21/0435; A63B 21/0442; A63B 21/055; A63B 21/0552; A63B 21/0555; A63B 21/0557; A63B 21/16; A63B 21/1609; A63B 21/4007; A63B 21/4027; A63B 21/4033; A63B 21/4034; A63B 21/4035; A63B 21/4039; A63B 23/035; A63B 23/03508; A63B 23/03516; A63B 23/03533; A63B 23/03541; A63B 23/0355; A63B 23/03558; A63B 23/03575; A63B 71/0009; A63B 2071/0018; A63B 2208/0204; A63B 2208/0228; A63B 2208/0233; A63B 2209/00; A63B 2209/10; A63B 2210/00; A63B 2210/02; A63B 2210/50; A63B 2225/10; A63B 2225/105; A63B 2225/107

See application file for complete search history.

(56) References Cited

U.S. PATENT DOCUMENTS

| | | | | |
|---|---|---|---|---|
| 3,085,250 | A | * | 4/1963 | Finlay ................ A41D 13/0537 2/102 |
| D270,585 | S | * | 9/1983 | Viio ............................... D2/829 |
| 5,141,482 | A | * | 8/1992 | Hern ................... A63B 21/0552 482/130 |
| 5,256,135 | A | * | 10/1993 | Avihod ................. A61F 5/3784 128/874 |

(Continued)

FOREIGN PATENT DOCUMENTS

WO    2013101526    7/2013

*Primary Examiner* — Gary D Urbiel Goldner
(74) *Attorney, Agent, or Firm* — Kyle A. Fletcher, Esq.

(57) ABSTRACT

The exercise vehicle seat cover comprises a vest portion, an apron portion, a seat and leg portion, and a plurality of resistance bands. The vest portion, the apron portion, and the seat and leg portion may couple to a car seat to cover and protect a back cushion and a seat cushion and may detachably couple to each other. The plurality of resistance bands may couple to a plurality of vest grommets, a plurality of seat grommets, or both. The plurality of resistance bands may be adapted for use by a driver to perform a resistance exercise while sitting in a vehicle while stationary. The vest portion and the plurality of resistance bands may be adapted to be removed from the car seat and worn by the driver while the driver is standing outside of the vehicle to exercise while standing.

16 Claims, 13 Drawing Sheets

(56) References Cited

U.S. PATENT DOCUMENTS

| | | | | |
|---|---|---|---|---|
| D352,816 S * | 11/1994 | Kirn | | D2/828 |
| 5,361,412 A * | 11/1994 | Perry | | A41D 13/0012 2/102 |
| 5,440,761 A * | 8/1995 | Abrams | | A41D 13/0012 2/102 |
| 5,673,836 A * | 10/1997 | Bush | | A41D 13/00 2/94 |
| 5,909,802 A * | 6/1999 | Puco | | A42B 1/045 2/102 |
| 6,256,791 B1 * | 7/2001 | Callahan | | A41D 13/0012 2/102 |
| 6,564,387 B1 * | 5/2003 | Willoughby | | A41D 13/0537 2/69 |
| 7,387,225 B2 * | 6/2008 | Fox | | A45F 3/14 224/257 |
| 7,707,652 B2 * | 5/2010 | Senegal | | A63B 21/4043 2/102 |
| 8,032,949 B1 * | 10/2011 | Matthews | | A45F 5/02 2/94 |
| 8,042,196 B1 * | 10/2011 | Kirby | | A41D 3/08 2/129 |
| 8,876,676 B2 | 11/2014 | Lalaoua | | |
| D734,922 S | 7/2015 | Docker | | |
| 9,387,357 B2 | 7/2016 | Mueller | | |
| 9,925,404 B1 * | 3/2018 | West | | A63B 21/0442 |
| 9,931,531 B2 | 4/2018 | Robinson | | |
| 10,287,020 B2 * | 5/2019 | Webb | | A47C 16/00 |
| 10,391,898 B1 * | 8/2019 | Richards | | B60N 2/688 |
| 10,857,409 B2 * | 12/2020 | Schreiber | | A63B 23/03541 |
| 2002/0113103 A1 * | 8/2002 | O'Hare | | A45F 3/08 224/155 |
| 2002/0137609 A1 * | 9/2002 | Rosati | | A63B 21/16 482/126 |
| 2006/0040805 A1 * | 2/2006 | Wilkinson | | A63B 21/4025 482/124 |
| 2007/0012734 A1 * | 1/2007 | Lee | | A45F 3/08 224/155 |
| 2007/0012735 A1 * | 1/2007 | Lee | | A45F 3/08 224/155 |
| 2007/0210125 A1 * | 9/2007 | Grabijas, III | | A45F 4/02 224/155 |
| 2007/0219074 A1 * | 9/2007 | Pride | | A63B 21/023 482/124 |
| 2008/0067203 A1 * | 3/2008 | Culhane | | A45F 5/02 224/155 |
| 2008/0122267 A1 * | 5/2008 | Larson | | A47C 7/021 297/4 |
| 2008/0301863 A1 * | 12/2008 | Goff | | A41D 13/0012 2/467 |
| 2009/0082183 A1 * | 3/2009 | Haynes | | A63B 21/4025 482/124 |
| 2012/0000003 A1 * | 1/2012 | Matthews | | A47C 3/16 2/69 |
| 2012/0065039 A1 | 3/2012 | Alessandri | | |
| 2012/0202658 A1 * | 8/2012 | Menefee, Sr. | | A63B 21/151 482/124 |
| 2014/0084646 A1 * | 3/2014 | Benden | | A47C 7/62 297/217.1 |
| 2015/0320219 A1 * | 11/2015 | Berns | | A45F 3/14 297/4 |
| 2016/0263420 A1 | 9/2016 | DuMee | | |
| 2017/0028244 A1 * | 2/2017 | Schreiber | | A63B 21/4043 |
| 2017/0036573 A1 * | 2/2017 | Webb | | A47C 16/00 |
| 2017/0246071 A1 * | 8/2017 | Schultz | | A61G 5/1043 |
| 2017/0291058 A1 | 10/2017 | Marji | | |
| 2018/0056104 A1 * | 3/2018 | Cromie | | A63B 21/4039 |
| 2020/0353891 A1 * | 11/2020 | Turjeman | | B60N 2/265 |

* cited by examiner

EXERCISE VEHICLE SEAT COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of exercise equipment and vehicular accessories, more specifically, an exercise vehicle seat cover.

SUMMARY OF INVENTION

The exercise vehicle seat cover comprises a vest portion, an apron portion, a seat and leg portion, and a plurality of resistance bands. The vest portion, the apron portion, and the seat and leg portion may couple to a car seat to cover and protect a back cushion and a seat cushion and may detachably couple to each other. The plurality of resistance bands may couple to a plurality of vest grommets, a plurality of seat grommets, or both. The plurality of resistance bands may be adapted for use by a driver to perform a resistance exercise while sitting in a vehicle stationary. The vest portion and the plurality of resistance bands may be adapted to be removed from the car seat and worn by the driver while the driver is standing outside of the vehicle to exercise while standing.

An object of the invention is to provide a protective cover for a car seat.

Another object of the invention is to provide a vest portion, an apron portion, and a seat and leg portion that may detachably couple to each other and that may couple to the car seat via straps.

A further object of the invention is to provide a plurality of resistance bands that may be coupled to the vest portion, to the seat and leg portion, or both and may be used to perform resistance training while seated.

Yet another object of the invention is to provide a vest portion that may be worn by the driver outside of the vehicle and that may be used for resistance training using one or more resistance bands.

These together with additional objects, features and advantages of the exercise vehicle seat cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the exercise vehicle seat cover in detail, it is to be understood that the exercise vehicle seat cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the exercise vehicle seat cover.

It is therefore important that the claims be regarded as including such equivalent construction insofar as they do not depart from the spirit and scope of the exercise vehicle seat cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Further-more, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 14.

The exercise vehicle seat cover 100 (hereinafter invention) comprises a vest portion 200, an apron portion 220, a seat and leg portion 240, and a plurality of resistance bands 280. The vest portion 200, the apron portion 220, and the seat and leg portion 240 may couple to a car seat 900 to cover and protect a back cushion 902 and a seat cushion 904. The vest portion 200, the apron portion 220, and the seat and leg portion 240 may detachably couple to each other. The plurality of resistance bands 280 may couple to a plurality of vest grommets 210, a plurality of seat grommets 250, or both. The plurality of resistance bands 280 may be adapted for use by a driver 950 to perform a resistance exercise while sitting in a vehicle while stationary. The vest portion 200 and the plurality of resistance bands 280 may be adapted to be removed from the car seat 900 and worn by the driver 950 while the driver 950 is standing outside of the vehicle to exercise while standing.

The vest portion 200 may comprise a left vest strap 202, a right vest strap 204, a vest loop fastener 206, and the plurality of vest grommets 210. The vest portion 200 may be a rectangular panel of washable fabric. The vest portion 200 may cover the upper car seat back. The vest portion 200 may comprise a headrest aperture 212. A headrest 906 may pass through the headrest aperture 212. The left vest strap 202 and the right vest strap 204 may be operable to wrap around the car seat 900 to hold the vest portion 200 in place. The ends of the left vest strap 202 and the right vest strap 204 may couple to each other using a vest strap coupler 214. In some embodiments, the vest strap coupler 214 may be a hook and loop fastener.

The plurality of vest grommets 210 may be points of attachment for the plurality of resistance bands 280. The plurality of vest grommets 210 may be disposed in pairs such that within each pair a first one of the plurality of vest grommets 210 is located adjacent to a left edge of the vest portion 200 and a second one of the plurality of vest grommets 210 is located laterally from the first one of the plurality of vest grommets 210 adjacent to a right edge of the vest portion 200.

The vest loop fastener 206 may be laterally oriented. The vest loop fastener 206 may couple the vest portion 200 to the apron portion 220. As a non-limiting example, the vest loop fastener 206 may be one half of a hook and loop fastener that complements a mating connector on the apron portion 220.

The apron portion 220 may comprise an apron loop fastener 226 and an apron hook fastener 228. The apron portion 220 may be a rectangular panel of washable fabric. The apron portion 220 may cover the lower car seat back.

The apron hook fastener 228 may be laterally oriented. The apron hook fastener 228 may couple the apron portion 220 to the seat and leg portion 240. As a non-limiting example, the apron hook fastener 228 may be one half of a hook and loop fastener that complements a mating connector on the seat and leg portion 240.

The apron loop fastener 226 may be laterally oriented. The apron loop fastener 226 may couple the apron portion 220 to the vest portion 200. As a non-limiting example, the apron loop fastener 226 may be one half of a hook and loop fastener that complements a mating connector on the vest portion 200.

The seat and leg portion 240 may comprise one or more left seat straps 242, one or more right seat straps 244, a seat hook fastener 248, and the plurality of seat grommets 250. The seat and leg portion 240 may be a rectangular panel of washable fabric. The seat and leg portion 240 may cover the car seat cushion. The one or more left seat straps 242 and the one or more right seat straps 244 may be operable to wrap around the car seat 900 to hold the seat and leg portion 240 in place. The ends of the one or more left seat straps 242 and the one or more right seat straps 244 may couple to each other using one or more seat strap couplers 254. In some embodiments, the one or more seat strap couplers 254 may be a hook and loop fastener.

The plurality of seat grommets 250 may be points of attachment for the plurality of resistance bands 280. The plurality of seat grommets 250 may be disposed in pairs such that within each pair a first one of the plurality of seat grommets 250 is located adjacent to a left edge of the seat and leg portion 240 and a second one of the plurality of seat grommets 250 is located laterally from the first one of the plurality of seat grommets 250 adjacent to a right edge of the seat and leg portion 240. The seat hook fastener 248 may be laterally oriented. The seat hook fastener 248 may couple the seat and leg portion 240 to the apron portion 220. As a non-limiting example, the seat hook fastener 248 may be one half of a hook and loop fastener that complements a mating connector on the apron portion 220.

The plurality of resistance bands 280 may couple to the plurality of vest grommets 210 in the vest portion 200, the plurality of seat grommets 250 in the seat and leg portion 240, or both. The plurality of resistance bands 280 may be adapted to be pulled by the driver 950 as a form of a resistance training exercise for the driver 950. Each individual resistance band selected from the plurality of resistance bands 280 may comprise a T stopper end 284, a stretch band 282, and a grip end 286. The T stopper end 284 may be a T-shaped termination of the individual resistance bands. The T stopper end 284 may be inserted into an individual grommet 290 selected from the plurality of vest grommets 210 or from the plurality of seat grommets 250 by bending the stretch band 282 90 degrees and passing a first end 292 of the T stopper end 284 through the individual grommet 290 followed by a second end 294 of the T stopper end 284. (See FIG. 8a.) When the stretch band 282 pulls on the T stopper end 284, the individual grommet 290 interferes with the passage of the first end 292 and the second end 294 thus retaining the individual resistance band. (See FIG. 8b.)

The grip end 286 may form a handle that may be adapted to be pulled by a driver's hand 952 or a driver's foot 954.

The stretch band 282 may be a cord made from an elastomeric material that has a first length when released and a second length when pulled where the second length is longer than the first length.

The invention 100 may be adapted to be used inside of the vehicle by coupling the vest portion 200, the apron portion 220, and the seat and leg portion 240 to the car seat 900, by coupling one or more of the plurality of resistance bands 280 to the plurality of vest grommets 210, to the plurality of seat grommets 250, or both, and by pulling the plurality of resistance bands 280 using the driver's hands 952 and/or the driver's feet 954 while the vehicle is stopped. The invention 100 may be adapted to be used outside of the vehicle by detaching the vest portion 200 from the car seat 900, wearing the vest portion 200 over the driver's shoulders with the left vest strap 202 and the right vest strap 204 wrapped around the driver's torso and coupled to each other, by coupling one or more of the plurality of resistance bands 280 to the plurality of vest grommets 210, and by pulling the plurality of resistance bands 280 using the driver's hands 952.

In some embodiments, the vest portion 200 may comprise a pocket 270 such that one or more weights may be added to enhance the exercise routine. The pocket 270 may be coupled to the back or front side of the vest portion 200 adjacent to the vest loop fastener 206.

In use, the vest portion 200, the apron portion 220, and the seat and leg portion 240 are coupled to each other by coupling the apron hook fastener 228 to the vest loop fastener 206 and the seat hook fastener 248 to the apron loop fastener 226. The vest portion 200 may be coupled to the car seat 900 by placing the headrest aperture 212 over the headrest 906, wrapping the left vest strap 202 and the right vest strap 204 around the car seat 900, and attaching the left vest strap 202 to the right vest strap 204 using the vest strap coupler 214. The seat and leg portion 240 may be coupled to the car seat 900 by wrapping the one or more left seat straps 242 and the one or more right seat straps 244 around the car seat 900 and attaching the one or more left seat straps 242 to the one or more right seat straps 244 using the one or more seat strap couplers 254.

If the driver 950 wishes to exercise while sitting still (by way of example and not of limitation, while parked and waiting for a passenger or while stopped in rush hour traffic), the driver 950 may couple one or more of the plurality of resistance bands 280 to the plurality of vest grommets 210 or to the plurality of seat grommets 250 by passing the T stopper ends 284 through the grommets. The driver 950 may pull the grip end 286 with the driver's hand 952 or the driver's foot 954 to perform a resistance training exercise. Various exercises can be performed to train different parts of the driver's body based upon where the individual resistance band is coupled to the vest portion 200 or to the seat and leg portion 240 and whether the individual resistance band is pulled straight forward, up, down, or across the body.

If circumstances permit the driver 950 to park and exit the vehicle, the driver 950 may detach the vest portion 200 from the apron portion 220 and uncouple the left vest strap 202 from the right vest strap 204. Then, standing next to the vehicle, the driver 950 may don the vest portion 200 by placing the vest portion 200 over their shoulders with their head rising through the headrest aperture 212, wrapping the left vest strap 202 and the right vest strap 204 around their torso, and coupled the left vest strap 202 to the right vest strap 204. The driver 950 may then couple one or more of the plurality of resistance bands 280 to the vest portion 200 and perform resistance training exercises before removing the vest portion 200 and replacing it in the vehicle. The exercise routine performed outside of the vehicle may be enhanced by placing the one or more weights into the pocket 270 on the back or front of the vest portion 200.

The invention 100 may include a headrest cover 777. The headrest cover 777 is configured to be positioned over the headrest 906 in order to protect the headrest 906 from sweat that the driver 950 may generate when using the invention 100.

The apron portion 220 may be further defined with a left member 788 and a right member 789. Both the left member 788 and the right member 789 include nylon hook and loop strips, which secure the left member 778 to the right member 789 in order to form a loop 790. The loop 790 formed of the left member 788 and the right member 789 is configured to encircle the car seat 900 or the driver 950.

Figure 1:
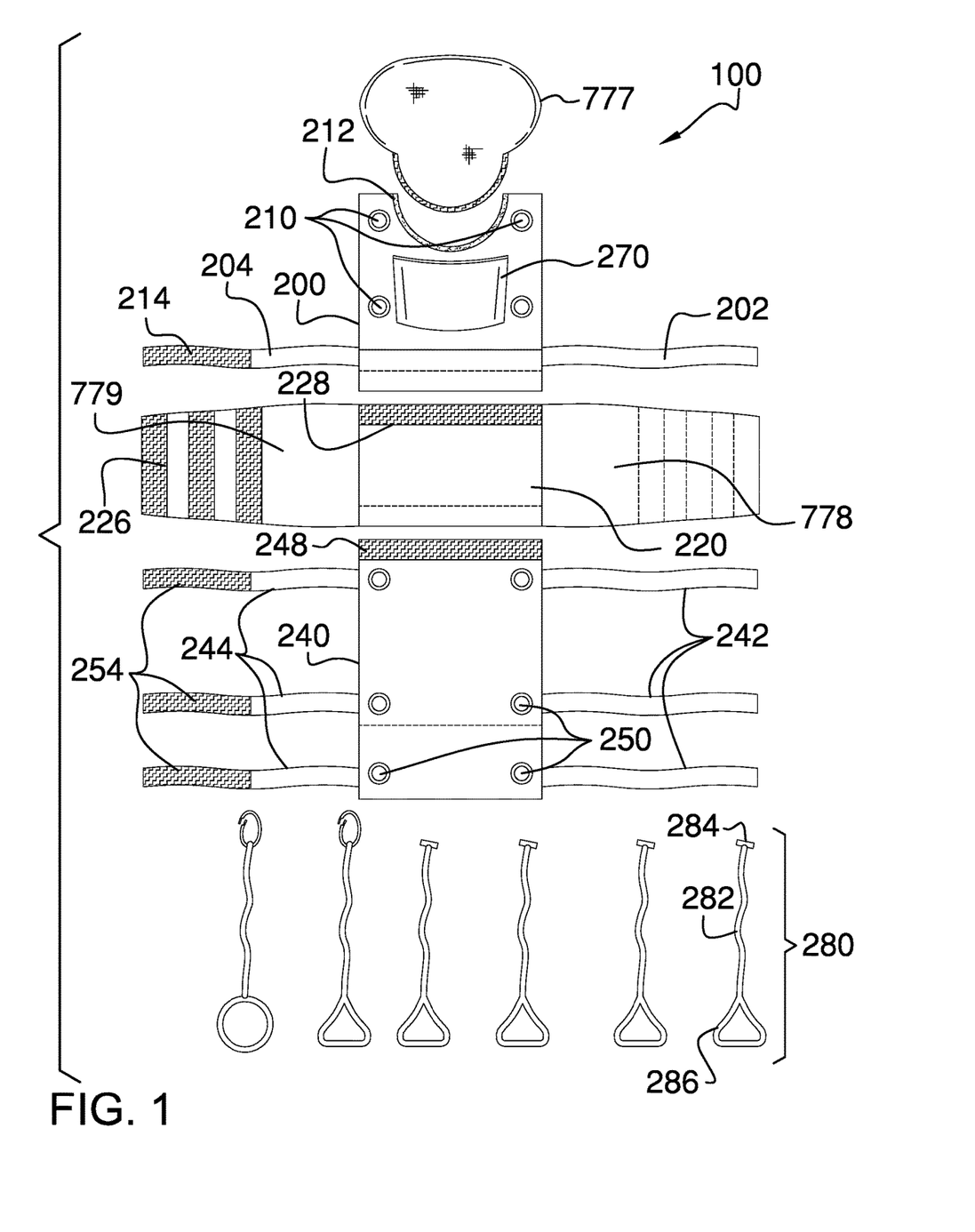
FIG. 1 is a front view of an embodiment of the disclosure.
Figure 2:
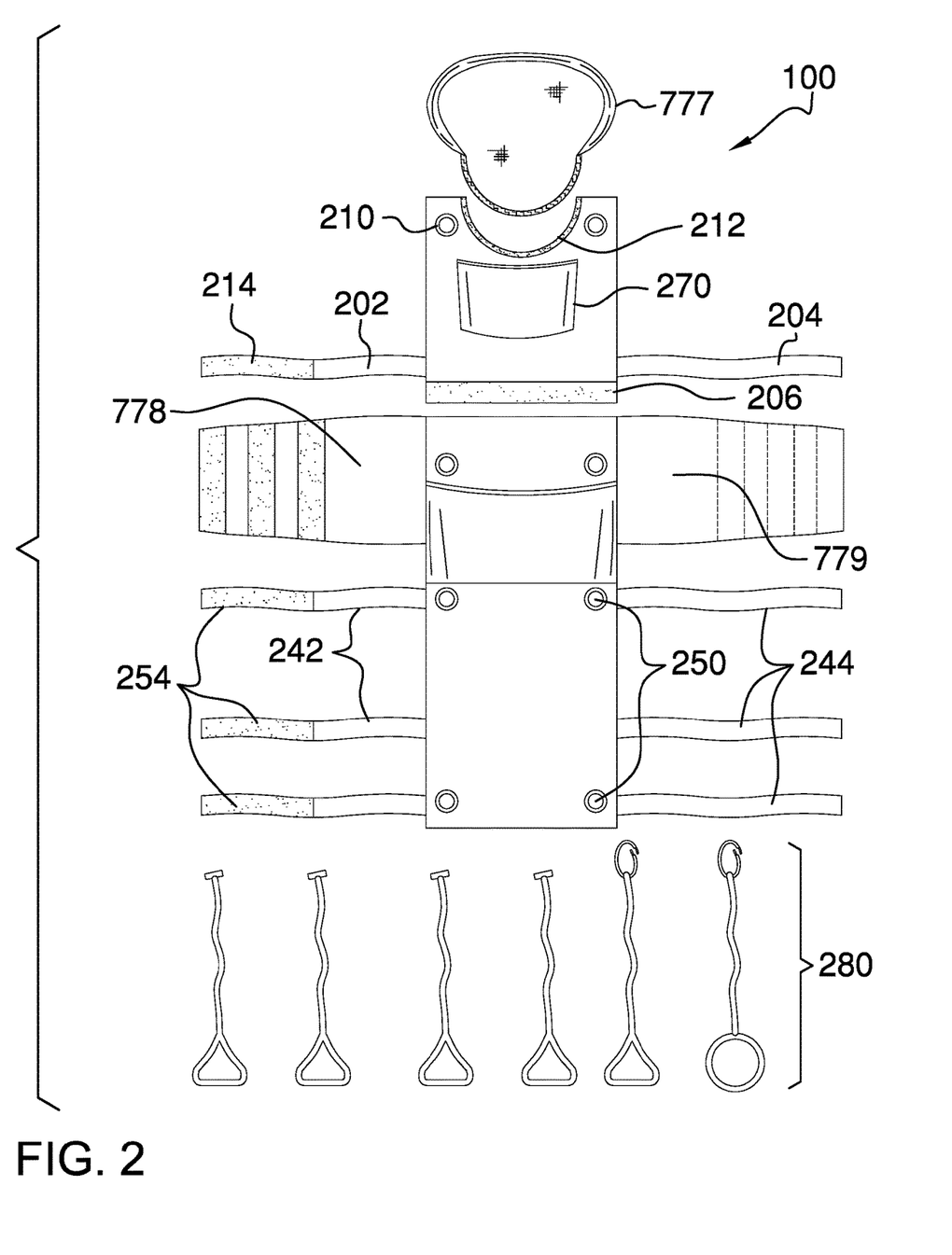
FIG. 2 is a rear view of an embodiment of the disclosure.
Figure 3:
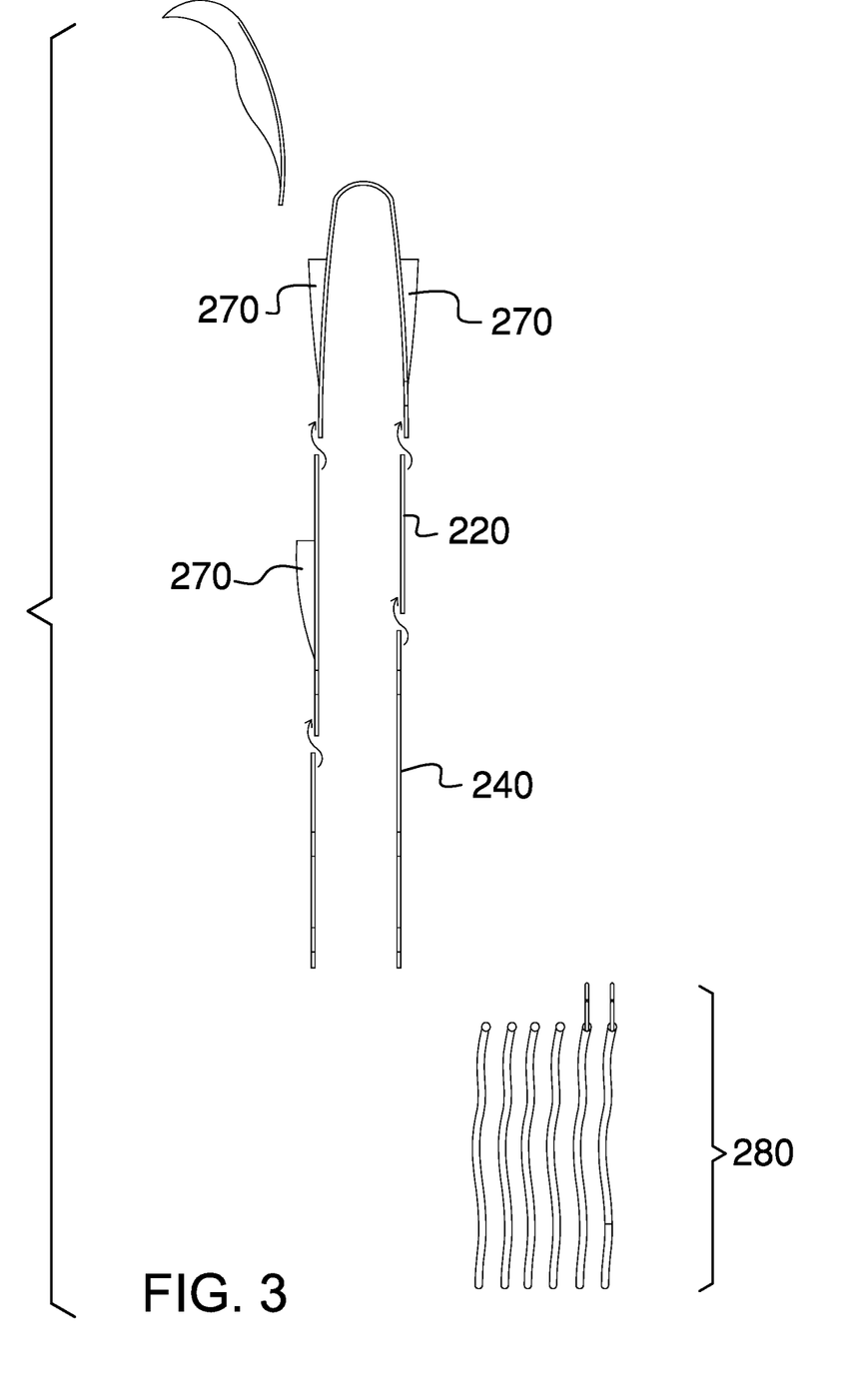
FIG. 3 is a side view of an embodiment of the disclosure.
Figure 4:
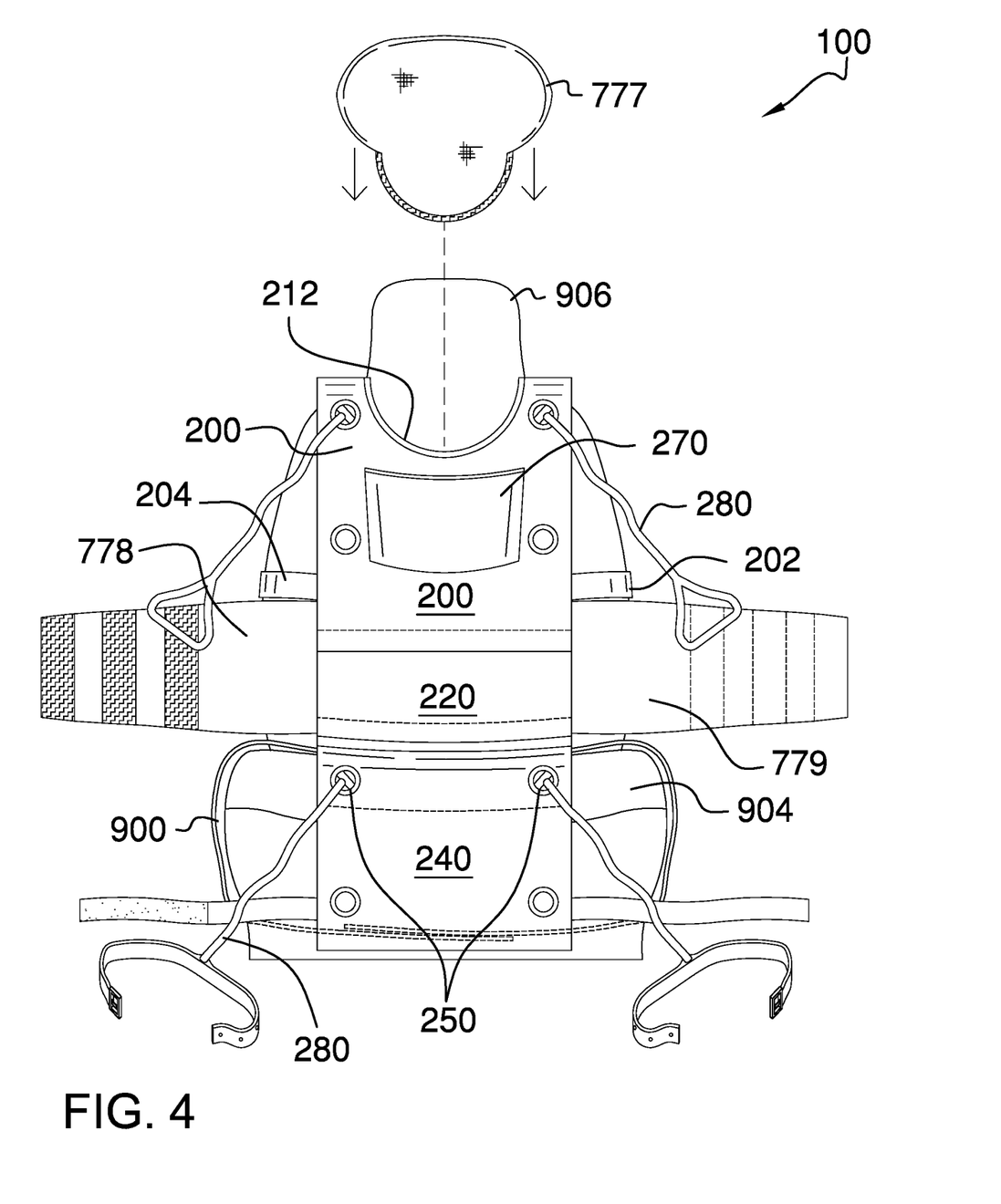
FIG. 4 is a front view of an embodiment of the disclosure while installed on a car seat.
Figure 5:
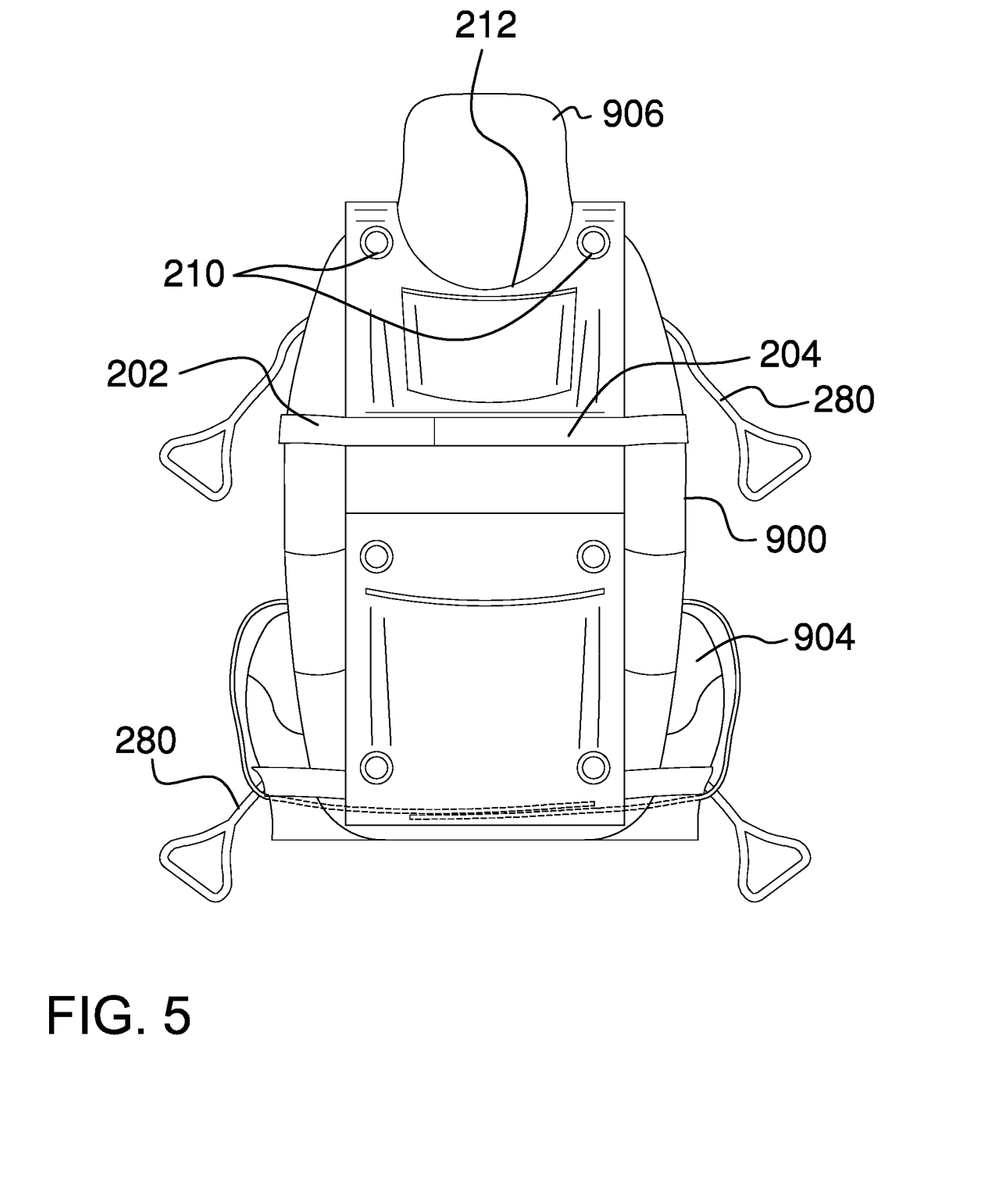
FIG. 5 is a rear view of an embodiment of the disclosure while installed on a car seat.
Figure 6:
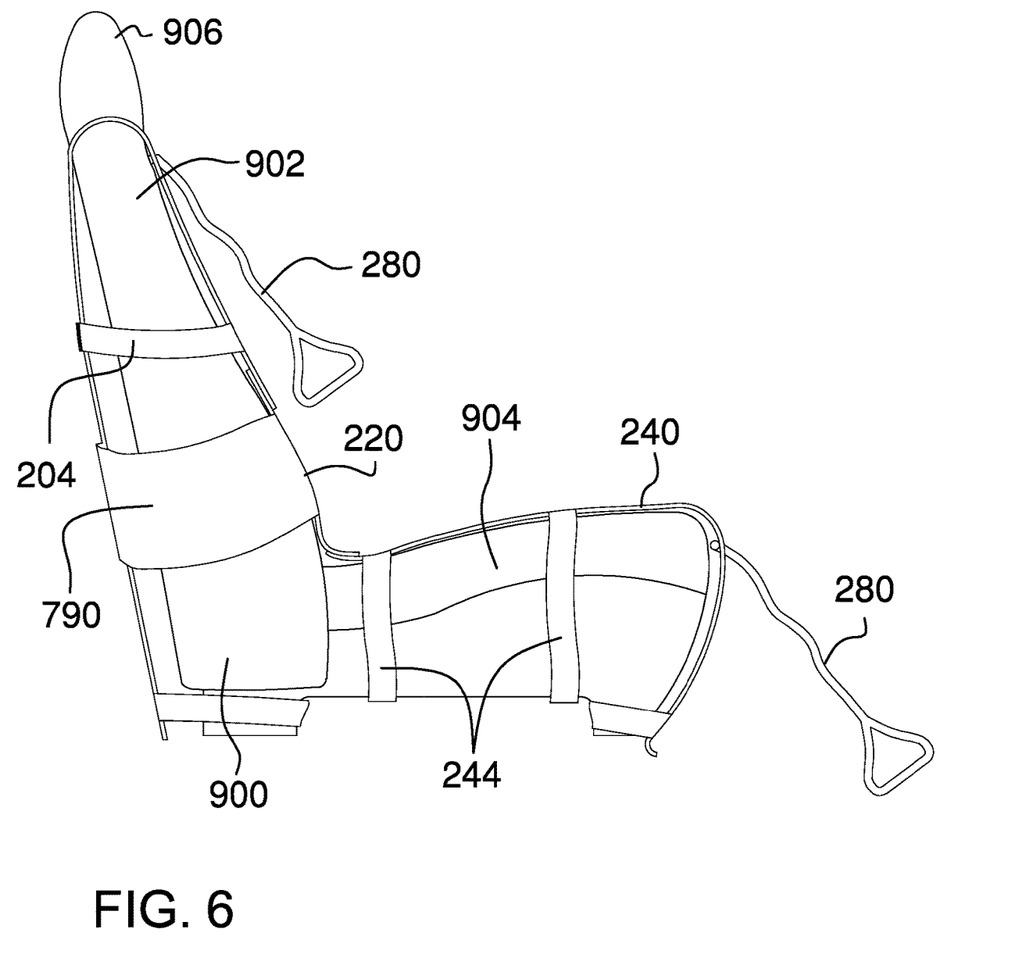
FIG. 6 is a side view of an embodiment of the disclosure while installed on a car seat
Figure 7:
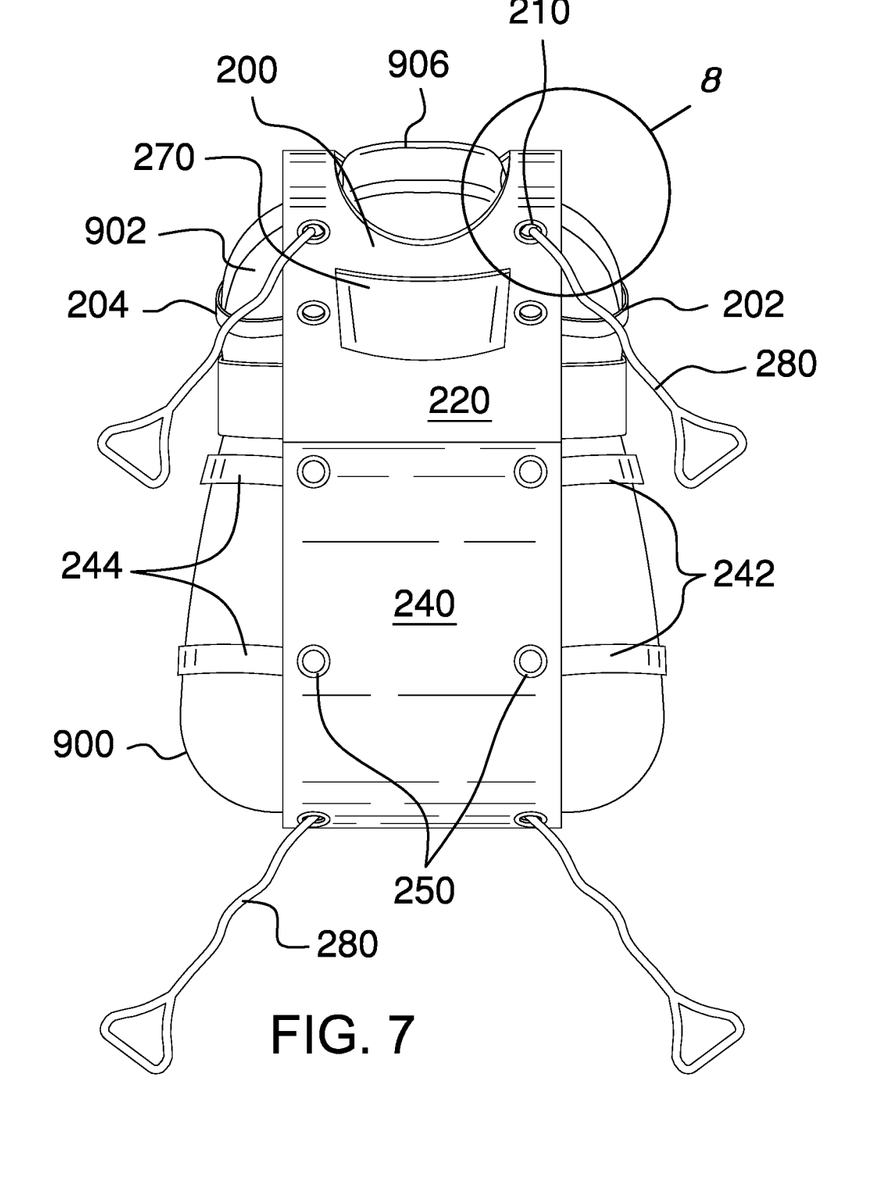
FIG. 7 is a top view of an embodiment of the disclosure while installed on a car seat.
Figure 8A:
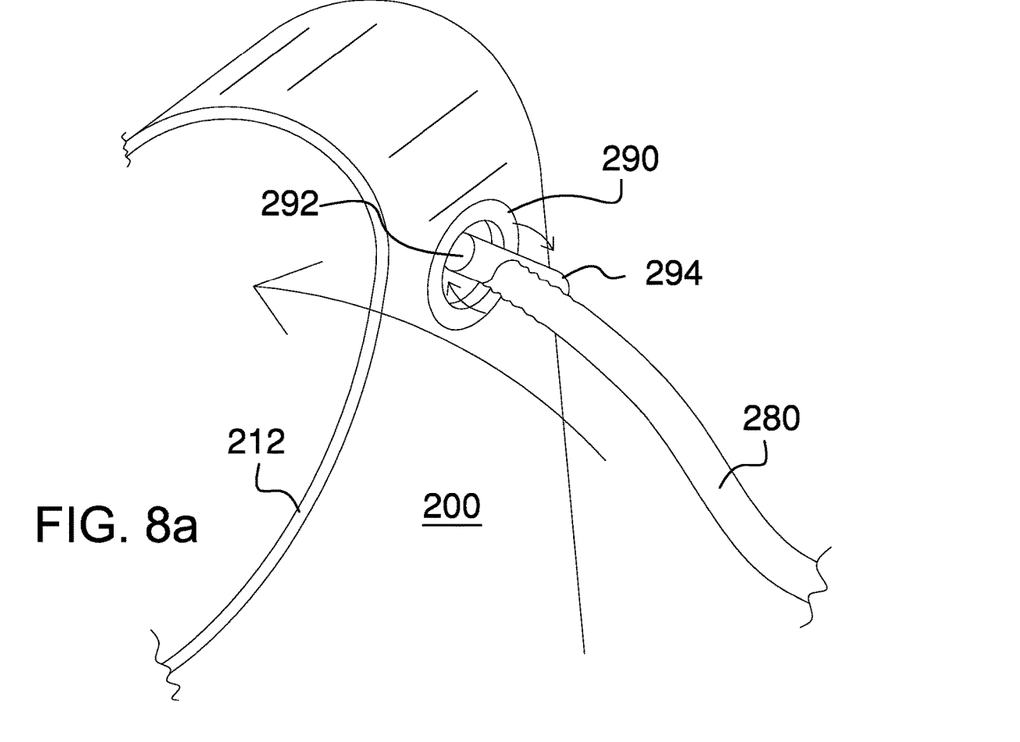
FIG. 8a is a detail view of an embodiment of the disclosure illustrating the are identified on FIG. 7 while installing a resistance band.
Figure 8B:
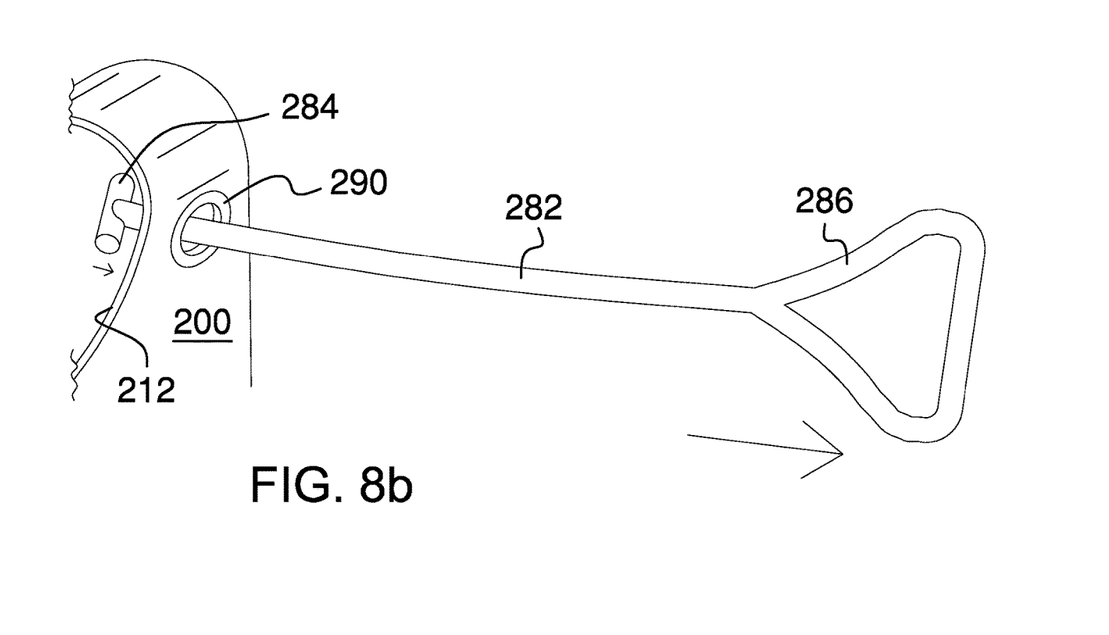
FIG. 8b is a detail view of an embodiment of the disclosure illustrating the are identified on FIG. 7 after installing a resistance band.
Figure 9:
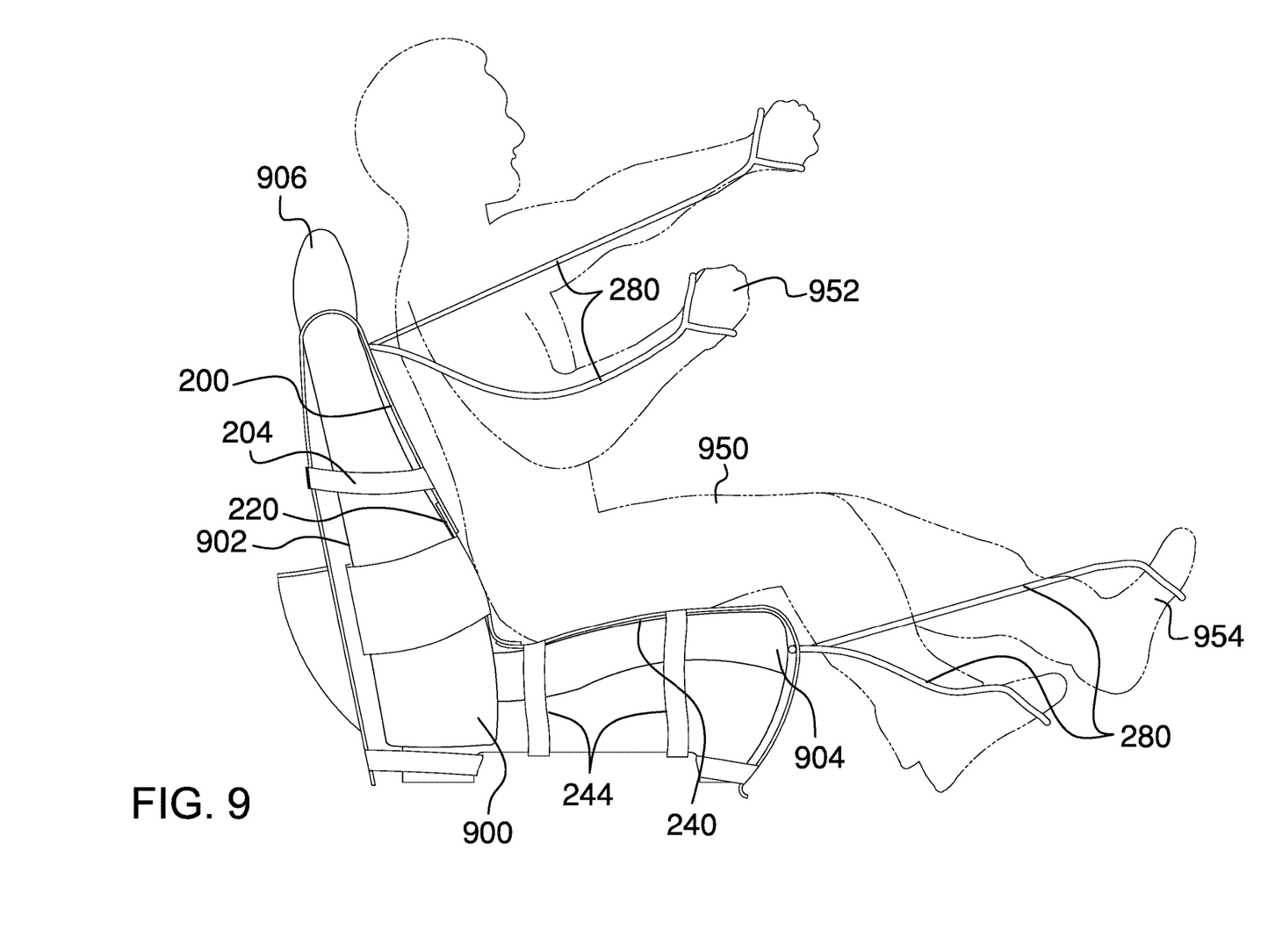
FIG. 9 is an in-use view of an embodiment of the disclosure illustrating a driver exercising while seated in a vehicle.
Figure 10:
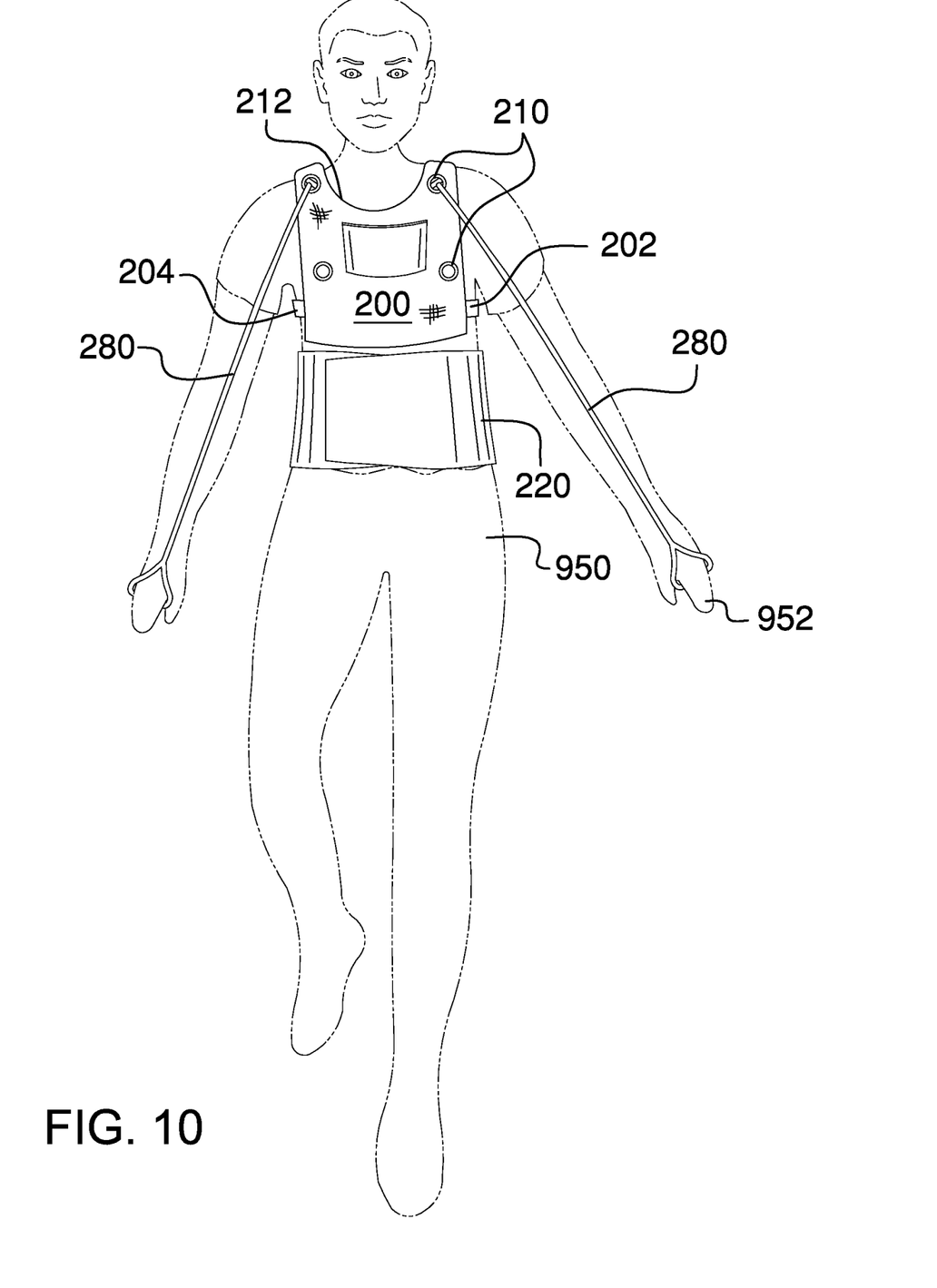
FIG. 10 is an in-use view of an embodiment of the disclosure illustrating a driver exercising while standing.
Figure 11:
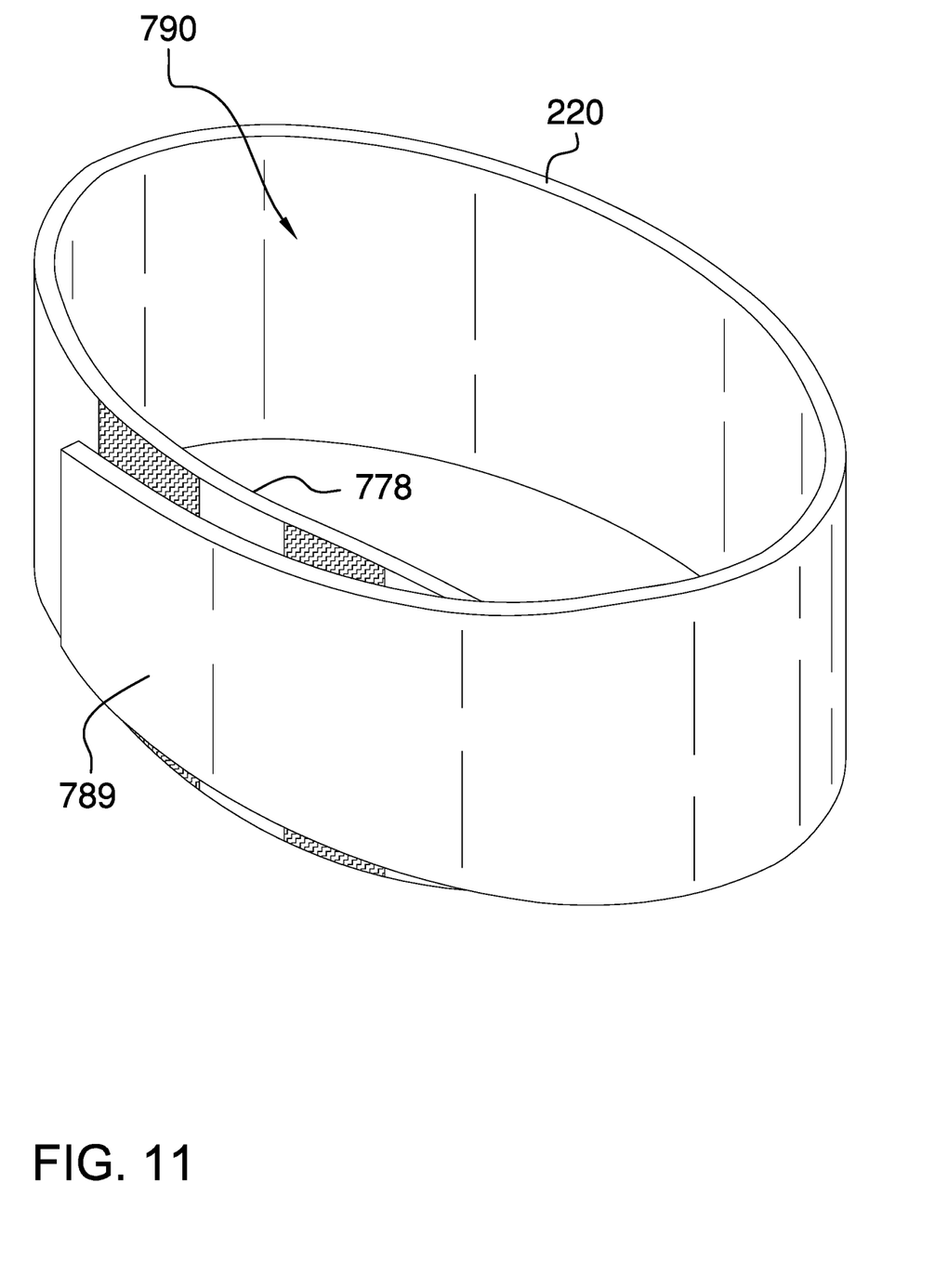
FIG. 11 is a perspective view of the apron portion by itself.
Figures 12, 13:
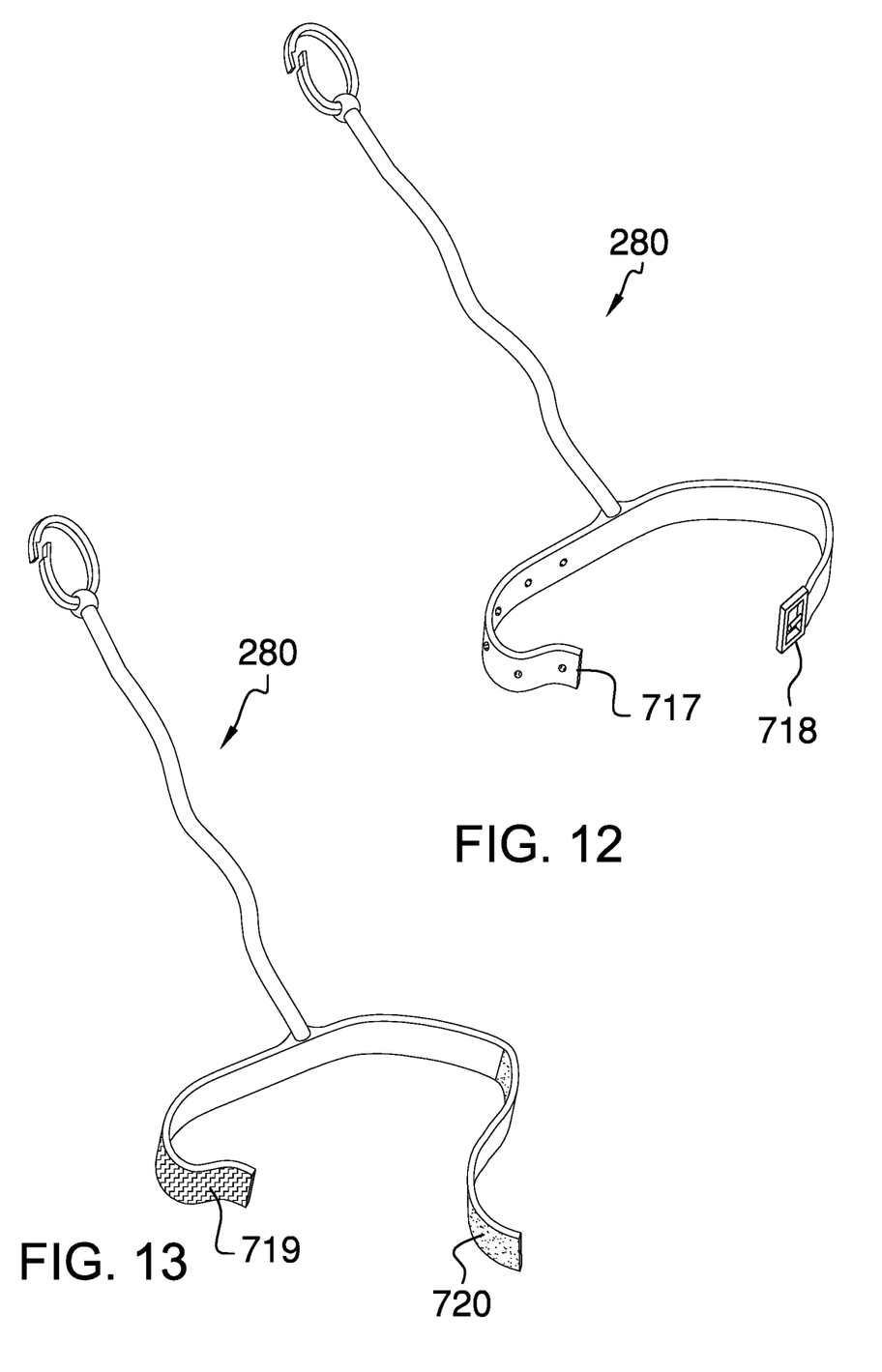
FIG. 12 is a perspective view of a resistance band with a belt and buckle configuration.
FIG. 13 is a perspective view of a resistance band with a nylon hook and loop configuration.

FIGS. 12 and 13 illustrate different embodiments of the plurality of resistance bands 280. Moreover, the plurality of resistance bands 280 may use a belt 717 and buckle arrangement 718 (see FIG. 12). Conversely, the plurality of resistance bands 280 may use a nylon hook and loop strip 719 and 720 (see FIG. 13).

Figure 14:
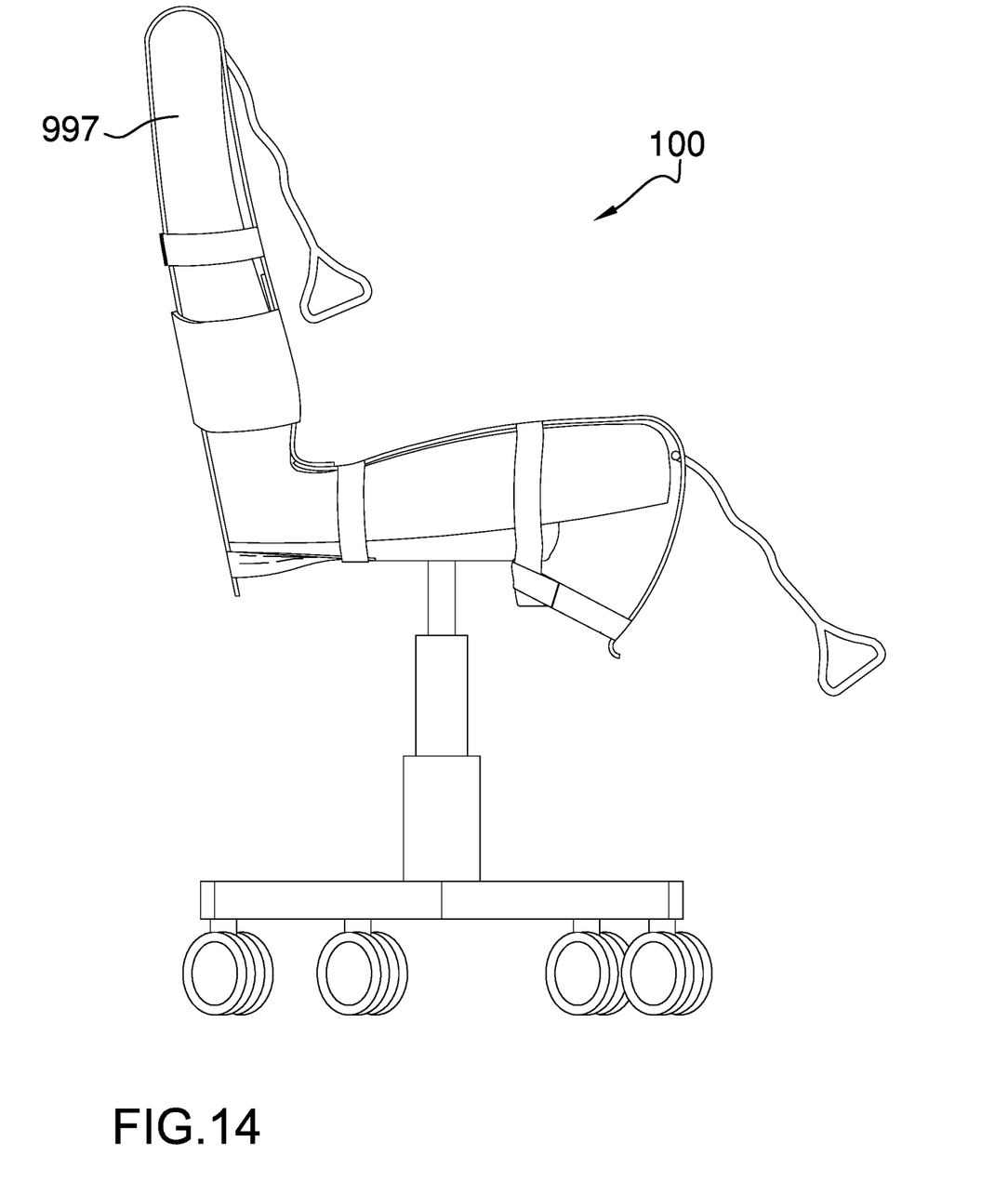
FIG. 14 is an in-use view of an embodiment of the disclosure in use with an office chair.

FIG. 14 illustrates the invention 100 being used on a desk chair 997 in lieu of the car seat 900.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used herein, the words "couple", "couples", "coupled" or "coupling", refer to connecting, either directly or indirectly, and does not necessarily imply a mechanical connection.

As used in this disclosure, "elastic" refers to a material or object that deforms when a force is applied to it and that is able to return to its relaxed shape after the force is removed. A material that exhibits these qualities is also referred to as an elastomeric material.

As used in this disclosure, a "fastener" is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, clips, ties, buttons, buckles, quick release buckles, or hook and loop fasteners.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "grommet" is an eyelet placed in a hole in a textile, sheet, or panel to protect a rope, hook, or cable passed through it and to protect the textile, sheet, or panel from being torn.

As used in this disclosure, a "handle" is an object by which a tool, object, or door is held or manipulated with the hand.

As used in this disclosure, a "headrest" is a pad that attaches to or extends from the back of a seat.

As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

As used in this disclosure, the word "lateral" refers to the sides of an object or movement towards a side. Lateral directions are generally perpendicular to longitudinal directions. "Laterally" refers to movement in a lateral direction.

As used in this disclosure a "strap" is a strip of leather, cloth, nylon, plastic, thin metal, rubber, or other flexible material, that is used to fasten, secure, carry, or hold onto something. A strap is sometimes used in conjunction with a buckle.

As used in this disclosure, a "vehicle" is a device that is used for transporting passengers, goods, or equipment.

With respect to the above description, it is to be realized that the optimum dimensional relationship for the various components of the invention described above and in FIGS. 1 through 10, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An exercise vehicle seat cover comprising:
a vest portion, an apron portion, a seat and leg portion, and a plurality of resistance bands;
wherein the vest portion and the apron portion are adapted to couple to a car seat to cover and protect a back cushion of the car seat, wherein the seat and leg portion is adapted to couple to the car seat to cover and protect a seat cushion of the car seat
wherein the vest portion and the apron portion detachably couple to each other, and wherein the apron portion and the seat and leg portion detachable couple to each other;
wherein the plurality of resistance bands couple to a plurality of vest grommets, a plurality of seat grommets, or both;
wherein the plurality of resistance bands are adapted for use by a driver to perform a resistance exercise while sitting in a vehicle that is stationary;
wherein the vest portion and the plurality of resistance bands are adapted to be removed from the car seat and worn by the driver while standing outside of the vehicle to exercise while standing;
wherein the vest portion comprises a left vest strap, a right vest strap, a vest loop fastener, and the plurality of vest grommets;
wherein the vest portion is a rectangular panel of washable fabric;
wherein the vest portion is adapted to cover an upper portion of the back cushion of the car seat;
wherein the vest portion comprises a headrest aperture;
wherein the headrest aperture is adapted to allow a headrest of the car seat to pass therethrough;
wherein the left vest strap and the right vest strap are operable to wrap around the car seat to hold the vest portion in place;
wherein ends of the left vest strap and the right vest strap couple to each other using a vest strap coupler;
wherein the plurality of vest grommets are points of attachment for the plurality of resistance bands;
wherein the plurality of vest grommets are disposed in pairs such that within each pair a first one of the plurality of vest grommets is located adjacent to a left edge of the vest portion and a second one of the plurality of vest grommets is located laterally from the first one of the plurality of vest grommets adjacent to a right edge of the vest portion.

2. The exercise vehicle seat cover according to claim 1 wherein the vest strap coupler is a first hook and loop fastener.

3. The exercise vehicle seat cover according to claim 1 wherein the vest loop fastener is laterally oriented;
wherein the vest loop fastener couples the vest portion to the apron portion.

4. The exercise vehicle seat cover according to claim 3 wherein the vest loop fastener is a loop part of a second hook and loop fastener that matingly complements a hook part of the second hook and loop fastener on the apron portion.

5. The exercise vehicle seat cover according to claim 3 wherein the apron portion comprises an apron loop fastener and an apron hook fastener, wherein the apron hook fastener is the hook part of the second hook and loop fastener;
wherein the apron portion is a rectangular panel of washable fabric;
wherein the apron portion is adapted to cover a lower portion of the back cushion of the car seat.

6. The exercise vehicle seat cover according to claim 5 wherein the apron loop fastener is laterally oriented;
wherein the apron loop fastener couples the apron portion to the seat and leg portion.

7. The exercise vehicle seat cover according to claim 6 wherein the apron loop fastener is a loop part of a third hook and loop fastener that matingly complements a hook part of the third hook and loop fastener on the seat and leg portion.

8. The exercise vehicle seat cover according to claim 6 wherein the apron hook fastener is laterally oriented;
wherein the apron hook fastener couples the apron portion to the vest portion.

9. The exercise vehicle seat cover according to claim 8 wherein the seat and leg portion comprises one or more left seat straps, one or more right seat straps, a seat hook fastener that is the hook part of the third hook and loop fastener, and the plurality of seat grommets;
wherein the seat and leg portion is a rectangular panel of washable fabric;
wherein the seat and leg portion is adapted to cover the seat cushion of the car seat;
wherein the one or more left seat straps and the one or more right seat straps are operable to wrap around the car seat to hold the seat and leg portion in place;
wherein ends of the one or more left seat straps and the one or more right seat straps couple to each other respectively using one or more seat strap couplers.

10. The exercise vehicle seat cover according to claim 9 wherein the one or more seat strap couplers are respectively a fourth hook and loop fastener.

11. The exercise vehicle seat cover according to claim 9 wherein the plurality of seat grommets are points of attachment for the plurality of resistance bands;
wherein the plurality of seat grommets are disposed in pairs such that within each pair a first one of the plurality of seat grommets is located adjacent to a left edge of the seat and leg portion and a second one of the plurality of seat grommets is located laterally from the first one of the plurality of seat grommets adjacent to a right edge of the seat and leg portion;

wherein the seat hook fastener is laterally oriented;

wherein the seat hook fastener couples the seat and leg portion to the apron portion.

12. The exercise vehicle seat cover according to claim 11 wherein the plurality of resistance bands couple to the plurality of vest grommets in the vest portion, the plurality of seat grommets in the seat and leg portion, or both;

wherein the plurality of resistance bands are adapted to be pulled by the driver to perform the resistance exercise;

wherein each individual resistance band selected from the plurality of resistance bands comprises a T stopper end, a stretch band, and a grip end;

wherein the T stopper end is a T-shaped termination of the individual resistance band;

wherein the T stopper end is inserted into an individual grommet selected from the plurality of vest grommets or from the plurality of seat grommets by bending the stretch band 90 degrees and passing a first end of the T stopper end through the individual grommet followed by a second end of the T stopper end;

wherein when the stretch band pulls on the T stopper end, the individual grommet interferes with the passage of the first end and the second end thus retaining the individual resistance band.

13. The exercise vehicle seat cover according to claim 12 wherein the grip end forms a handle that is adapted to be pulled by a hand of the driver or a foot of the driver.

14. The exercise vehicle seat cover according to claim 13 wherein the stretch band is a cord made from an elastomeric material that has a first length when released and a second length when pulled where the second length is longer than the first length.

15. The exercise vehicle seat cover according to claim 14 wherein the exercise vehicle seat cover is adapted to be used inside of the vehicle by coupling the vest portion, the apron portion, and the seat and leg portion to the car seat, by coupling one or more of the plurality of resistance bands to the plurality of vest grommets, to the plurality of seat grommets, or both, and by pulling the one or more of the plurality of resistance bands using hands of the driver and/or feet of the driver while the vehicle is stationary;

wherein the exercise vehicle seat cover is adapted to be used outside of the vehicle by detaching the vest portion from the car seat, wearing the vest portion over shoulders of the driver with the left vest strap and the right vest strap wrapped around a torso of the driver and coupled to each other, by coupling one or more of the plurality of resistance bands to the plurality of vest grommets, and by pulling the one or more of the plurality of resistance bands using the driver's hands.

16. The exercise vehicle seat cover according to claim 15 wherein the vest portion comprises a pocket such that one or more weights are added to enhance an exercise routine;

wherein the pocket is coupled to a back or a front side of the vest portion adjacent to the vest loop fastener;

wherein the vest portion, the apron portion, and the seat and leg portion are adapted to couple to a desk chair instead of the car seat.

* * * * *